(12) United States Patent
Kanazawa

(10) Patent No.: US 6,287,370 B1
(45) Date of Patent: Sep. 11, 2001

(54) DRAIN DISCHARGE APPARATUS

(75) Inventor: Takehiko Kanazawa, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/516,363

(22) Filed: Mar. 1, 2000

(30) Foreign Application Priority Data

May 18, 1999 (JP) .................................................. 11-137868

(51) Int. Cl.[7] .................................................. B01D 17/028
(52) U.S. Cl. .......................... 96/409; 137/181; 137/192; 137/193
(58) Field of Search .............................. 96/409; 137/181, 137/192, 193

(56) References Cited

U.S. PATENT DOCUMENTS

| | | | |
|---|---|---|---|
| 1,701,343 | * 2/1929 | Steenstrup ........................... 137/181 |
| 2,510,049 | * 5/1950 | Neeson ................................ 96/409 X |
| 2,760,596 | * 8/1956 | Kellie .................................... 96/409 |
| 3,199,526 | * 8/1965 | Pall ...................................... 137/192 |
| 3,330,292 | * 7/1967 | Lansky ................................. 137/192 |
| 3,378,993 | * 4/1968 | Veres et al. .......................... 96/409 |
| 3,642,201 | * 2/1972 | Potchen ........................... 137/193 X |
| 4,082,107 | * 4/1978 | Hoffman et al. .................... 137/195 |
| 5,626,163 | * 5/1997 | Kushiya ............................... 137/181 |
| 5,636,655 | * 6/1997 | Kawamura et al. .............. 137/195 X |

* cited by examiner

Primary Examiner—Gerald A. Michalsky
(74) Attorney, Agent, or Firm—Oblon, Spivak, McClelland, Maier & Neustadt, P.C.

(57) ABSTRACT

Disclosed is a drain discharge apparatus comprising a float provided displaceably in response to drain stored at the inside of a filter case, a handle formed with a drain discharge port for discharging the drain stored in the filter case to the outside, and a swinging mechanism for operating a valve plug for opening and closing the drain discharge port by the aid of a lever linked to displacement of the float.

7 Claims, 10 Drawing Sheets

DRAIN DISCHARGE

DRAIN DISCHARGE APPARATUS

BACKGROUND OF THE INVENTION

1. Field of the Invention

The present invention relates to a drain discharge apparatus capable of smoothly discharging the drain accumulated in a fluid pressure circuit to the outside.

2. Description of the Related Art

A drain discharge apparatus has been hitherto used, for example, in order that the drain, which is accumulated in a fluid pressure circuit, is discharged to the outside. As shown in FIGS. 9 and 10, the drain discharge apparatus 1 concerning such a conventional technique comprises a bowel 3 which is surrounded by a cover member 2. A drain cock 5, which has a drain discharge port 4, is installed to a bottom surface portion of the bowel 3.

Those arranged in the bowel 3 include a float 6 which is floated by the drain stored in the bowel 3, and a first valve member 9 which is operated such that a plate-shaped valve plug 7 is separated from a seat section 8 to give the valve-open state when the float 6 is floated. A support member 10 is arranged in the internal space of the float 6. An annular screen 12, through which the drain is allowed to pass, is provided on a lower end side of the support member 10.

Those arranged in the bowel 3 further include a piston 14 which is urged downwardly in accordance with the action of the resilient force of a spring member 13 and which is displaceable along the inner wall surface of the support member 10, and a second valve member 16 which is constructed by a piston packing 15 for seating the piston 14 thereon.

A filter 17 is installed to a central portion of the piston 14. A bleed passage 18, which makes penetration in the axial direction, is formed at the inside of the piston 14.

In the ordinary state shown in FIG. 9, the air having a predetermined pressure is charged in the bowel 3, giving a situation in which the piston 14 overcomes the resilient force of the spring member 13 owing to the pressure of the air, and the piston 14 is displaced upwardly.

The operation of the drain discharge apparatus 1 concerning the conventional technique will be briefly explained. Starting from the initial position shown in FIG. 9, when the float 6 is floated in accordance with the action of the drain stored in the bowel 3, then the valve plug 7 is displaced integrally with the float 6, and thus it is separated from the seat section 8. Accordingly, the first valve member 9 is in the valve-open state. Therefore, the air, which is introduced through the opening of the seat section 8, flows to the side over the piston 14, i.e., to the internal space of the support member 10, and it presses the piston 14 downwardly. The piston 14 is pushed and moved downwardly in accordance with the pressing force of the air and the resilient force of the spring member 13. Accordingly, the piston 14 is separated from the piston packing 15, and the second valve member 16 is in the valve-open state. As a result, as shown in FIG. 10, the drain, which has passed through the screen 12, passes through the gap between the piston packing 15 and the piston 14, and it is discharged to the outside from the drain discharge port 4.

The float 6 is moved downwardly as the drain is discharged. The valve member 7 is seated on the seat section 8, and thus the first valve member 9 is in the valve-closed state. In this arrangement, the air, which remains on the side over the piston 14, is exhausted to the outside via the bleed passage 18. The piston 14 is pushed and moved upwardly by the air in the bowel 3, and it is restored to the initial position shown in FIG. 9.

When the air in the bowel 3 is exhausted, the air pressure to push and move the piston 14 upwardly disappears. Therefore, the piston 14 is displaced downwardly in accordance with the resilient force of the spring member 13, and the second valve member 16 is in the valve-closed state. As a result, the drain, which has passed through the screen 12, passes through the gap between the piston packing 15 and the piston 14, and it is discharged to the outside from the drain discharge port 4.

However, the drain discharge apparatus 1 concerning the conventional technique described above involves such an inconvenience that the structure of the entire apparatus is complicated, a large number of parts are required, and the production cost is expensive.

The drain discharge apparatus 1 concerning the conventional technique adopts the following arrangement. That is, when the drain is discharged, the air is always exhausted to the outside via the orifice of the seat section 8, the filter 17, the bleed passage 18, and the drain discharge port 4. Therefore, an inconvenience arises in that the air is wasted.

Further, in the case of the drain discharge apparatus 1 concerning the conventional technique, when the air is newly supplied to the inside of the bowel 3 after the air in the bowel 3 is exhausted to the outside, then the piston 14 is located at the downward position due to the resilient force of the spring member 13, and the second valve member 16 is in the valve-open state. For this reason, the air in the bowel 3 passes through the screen 12 and the gap between the piston packing 15 and the piston 14 respectively, and it is discharged to the outside from the drain discharge port 4, until the air arrives at an air pressure which is required to displace the piston 14 upwardly against the resilient force of the spring member 13. Therefore, the drain discharge apparatus 1 concerning the conventional technique involves an inconvenience that the air is wasted, also from this viewpoint.

SUMMARY OF THE INVENTION

A general object of the present invention is to provide a drain discharge apparatus which makes it possible to simplify the structure, reduce the number of parts, and reduce the production cost by operating a valve plug for opening and closing a drain discharge port by using a lever which is linked to the displacement of a float.

A principal object of the present invention is to provide a drain discharge apparatus which makes it possible to avoid any waste of air by disusing the bleed of air remaining in a casing to the outside.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
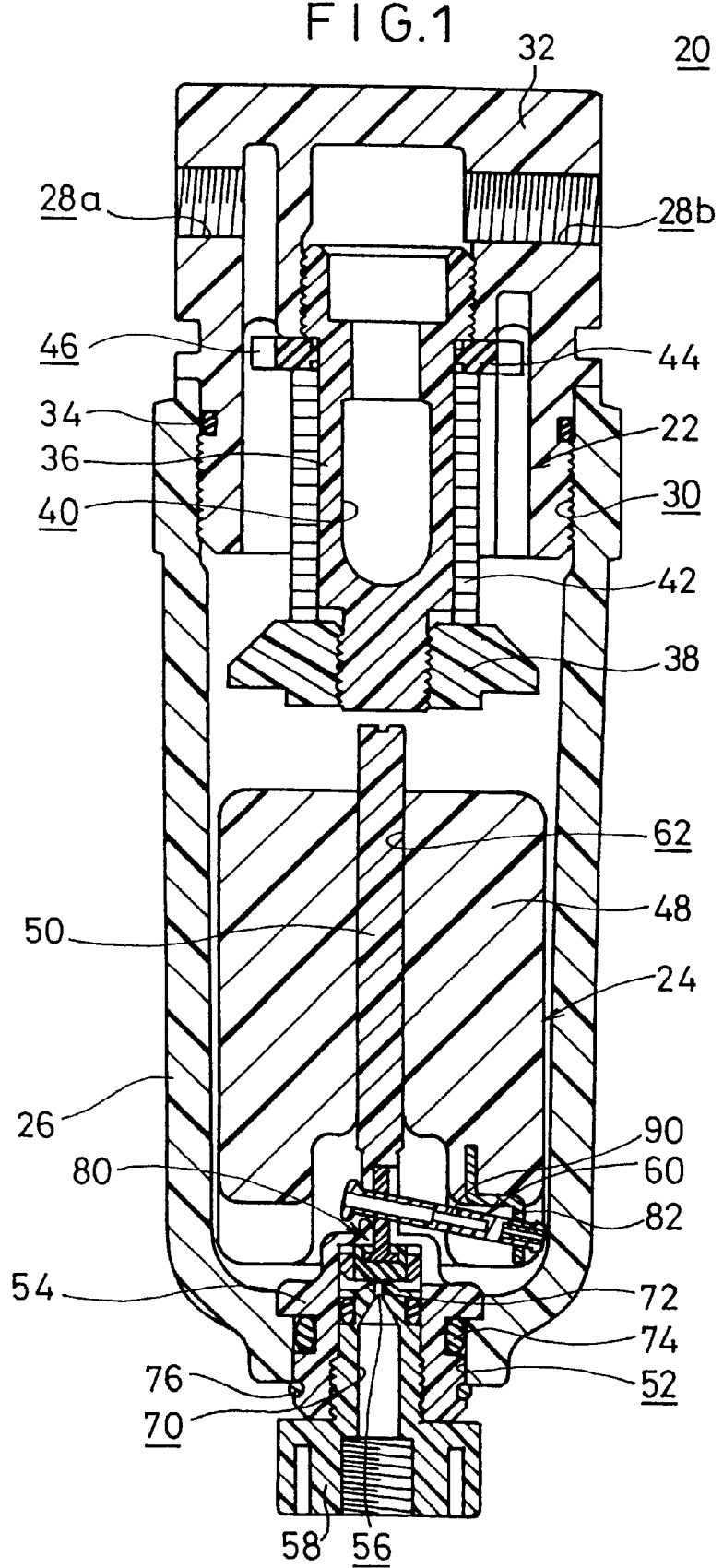
FIG. 1 shows a longitudinal sectional view taken in an axial direction of an air filter to which a drain discharge apparatus according to an embodiment of the present invention is applied.

With reference to FIG. 1, reference numeral 20 indicates an air filter to which the drain discharge apparatus according to the embodiment of the present invention is applied.

The air filter 20 basically comprises a filter section 22 and a drain discharge section 24.

The filter section 22 includes a filter case 26 which is formed to have a bottom-equipped cylindrical configuration, and a cover member 32 which has a compressed air inlet port 28a and a compressed air outlet port 28b, for closing an opening 30 formed at an upper portion of the filter case 26. A seal member 34 for holding an air-tight state of the fitted portion between the filter case 26 and the cover member 32 is installed to an annular groove of the cover member 32.

Figure 2:
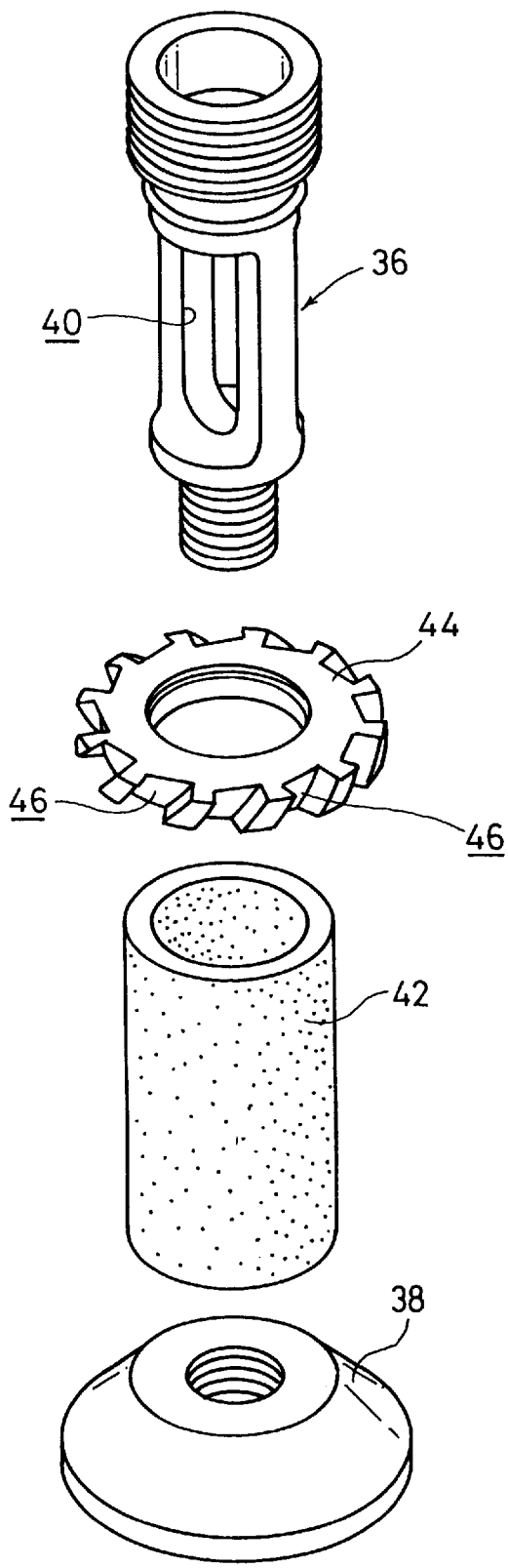
FIG. 2 shows an exploded perspective view illustrating a filter section for constructing the air filter.

As shown in FIG. 2, a baffle 38 is connected to a central portion of the bottom of the cover member 32 via a rod 36. An opening 40 having a substantially elliptic configuration, which communicates with the compressed air outlet port 28, is formed in the rod 36 to make penetration in a direction substantially perpendicular to the axis. A cylindrical filter element 42 and a ring-shaped deflector 44 are externally fitted to the outer circumferential surface of the rod 36. A plurality of inclined grooves 46 are formed on the outer circumferential surface of the deflector 44.

In this arrangement, the deflector 44 functions to give the swirl motion to the compressed air introduced from the compressed air inlet port 28a so that water droplets and foreign matters are separated in accordance with the cyclone effect. The baffle 38 functions to prevent the drain separated by the deflector 44 from being swirled upwardly. The filter element 42 functions to filtrate foreign manners which could not be separated by the deflector 44.

Figure 3:
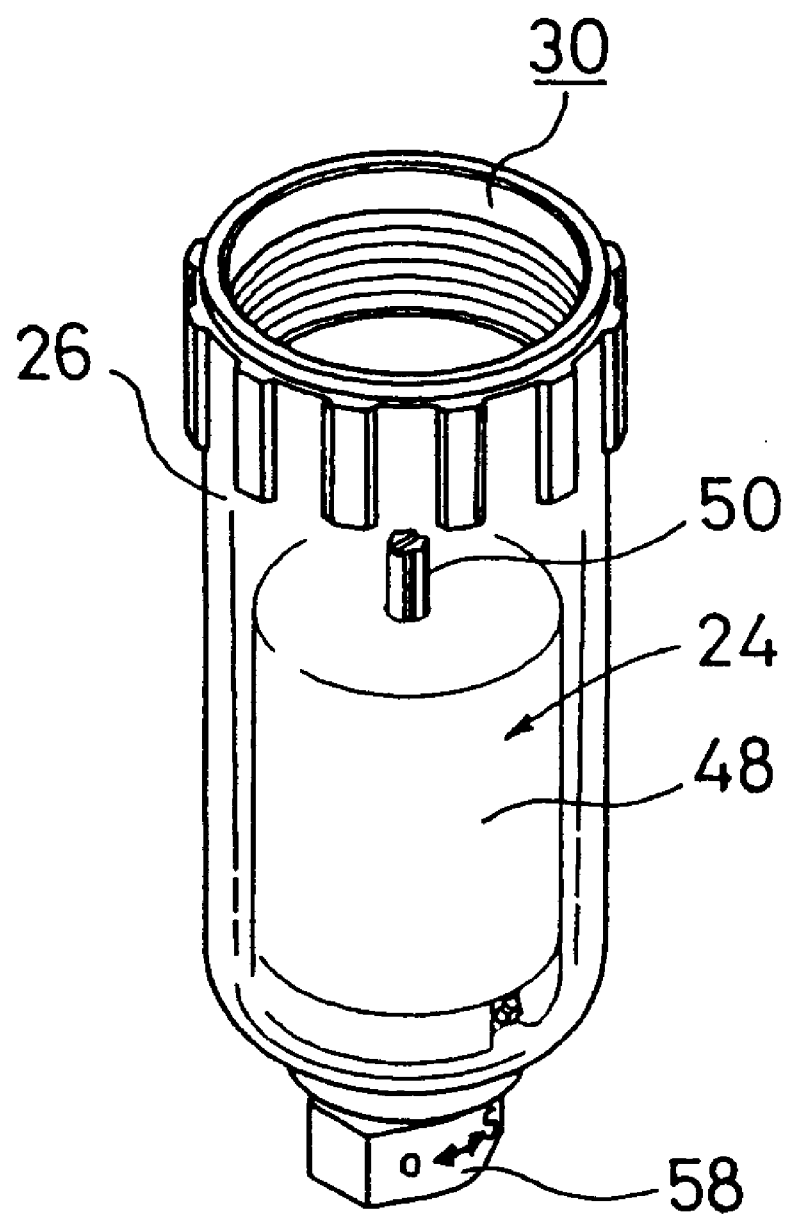
FIG. 3 shows a perspective view illustrating a drain discharge section for constructing the air filter.
Figure 4:
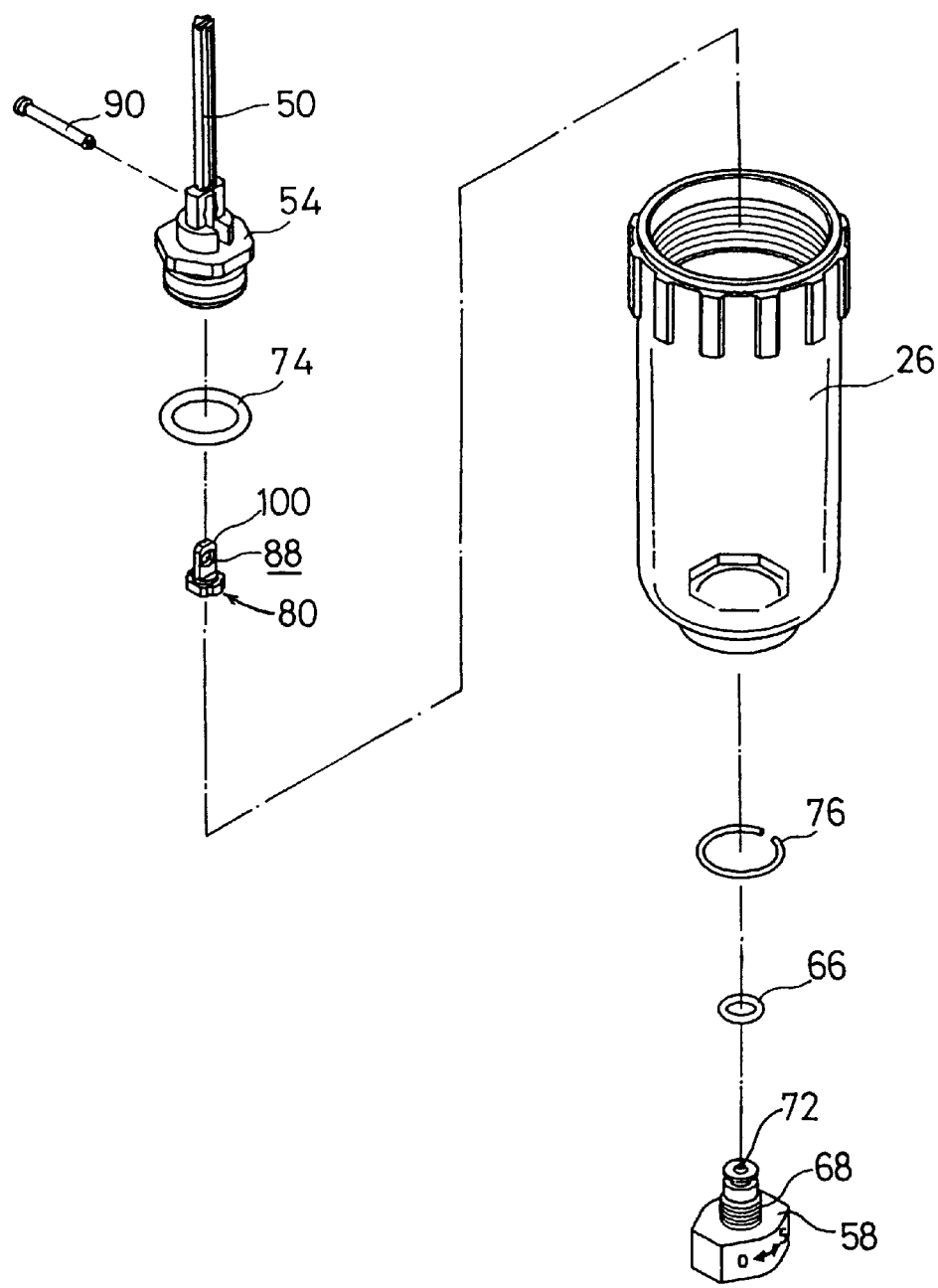
FIG. 4 shows an exploded perspective view illustrating the drain discharge section shown in FIG. 3.

As shown in FIGS. 1, 3, and 4, the drain discharge section 24 includes a float 48 which is floated by the drain transmitted via the inner wall of the filter case 26 and stored at the lower portion and which is restored to the initial position by being moved downwardly when the drain is discharged, a holder 54 which is provided with a rod-shaped guide section 50 for guiding the float 48 and which closes a hole 52 formed at the lower end of the filter case 26, a handle 58 which is screwed to a hole of the holder 54 and which has a drain discharge port 56 formed at one end of a penetrating hole, and a swinging mechanism 60 which is linked to the displacement of the float 48 to open and close the drain discharge port 56. The holder 54 and the handle 58 function as the closing member.

Figure 5:
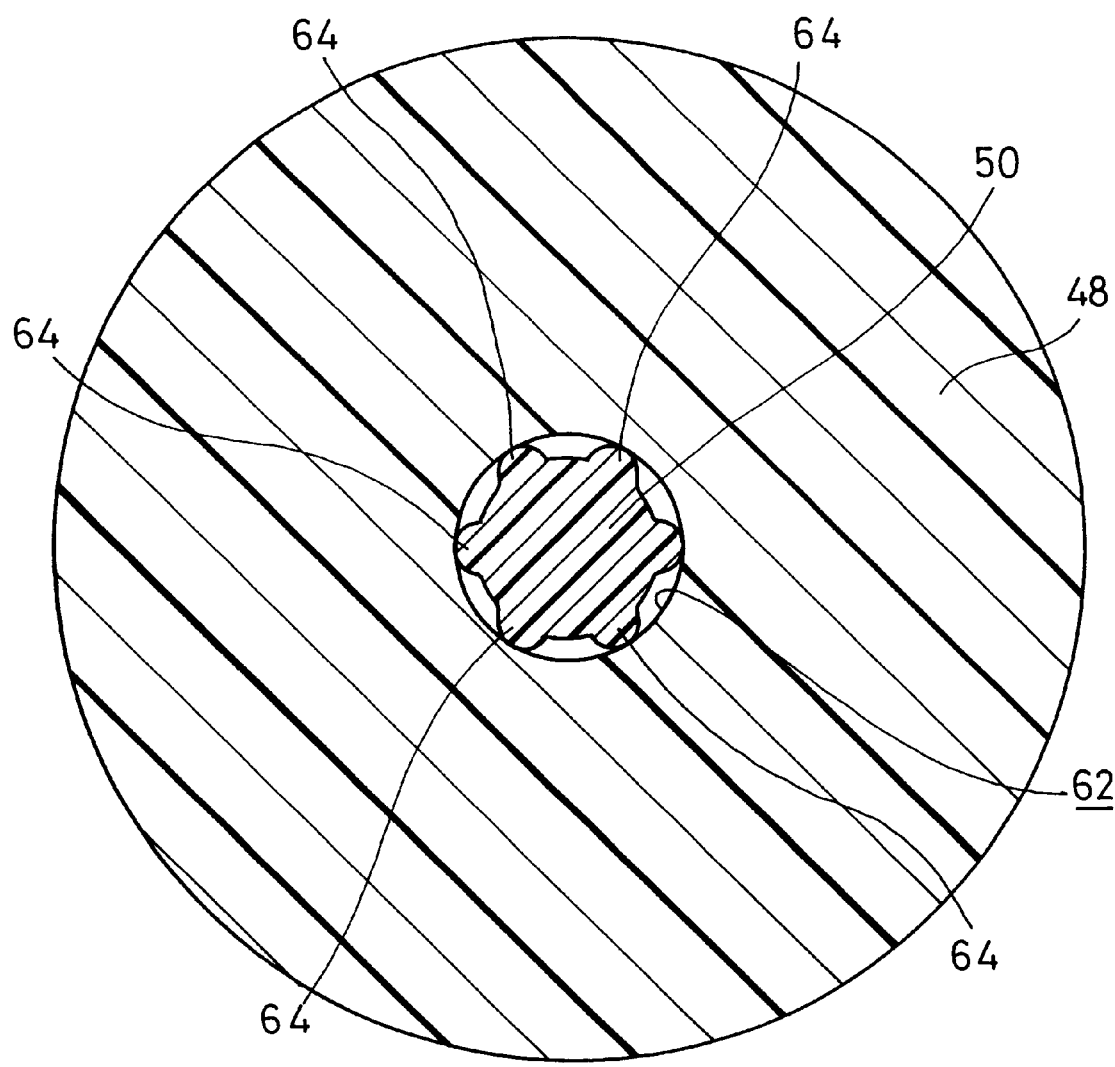
FIG. 5 shows a cross-sectional view taken in a direction substantially perpendicular to the axis of a float and a guide section.
Figure 6:
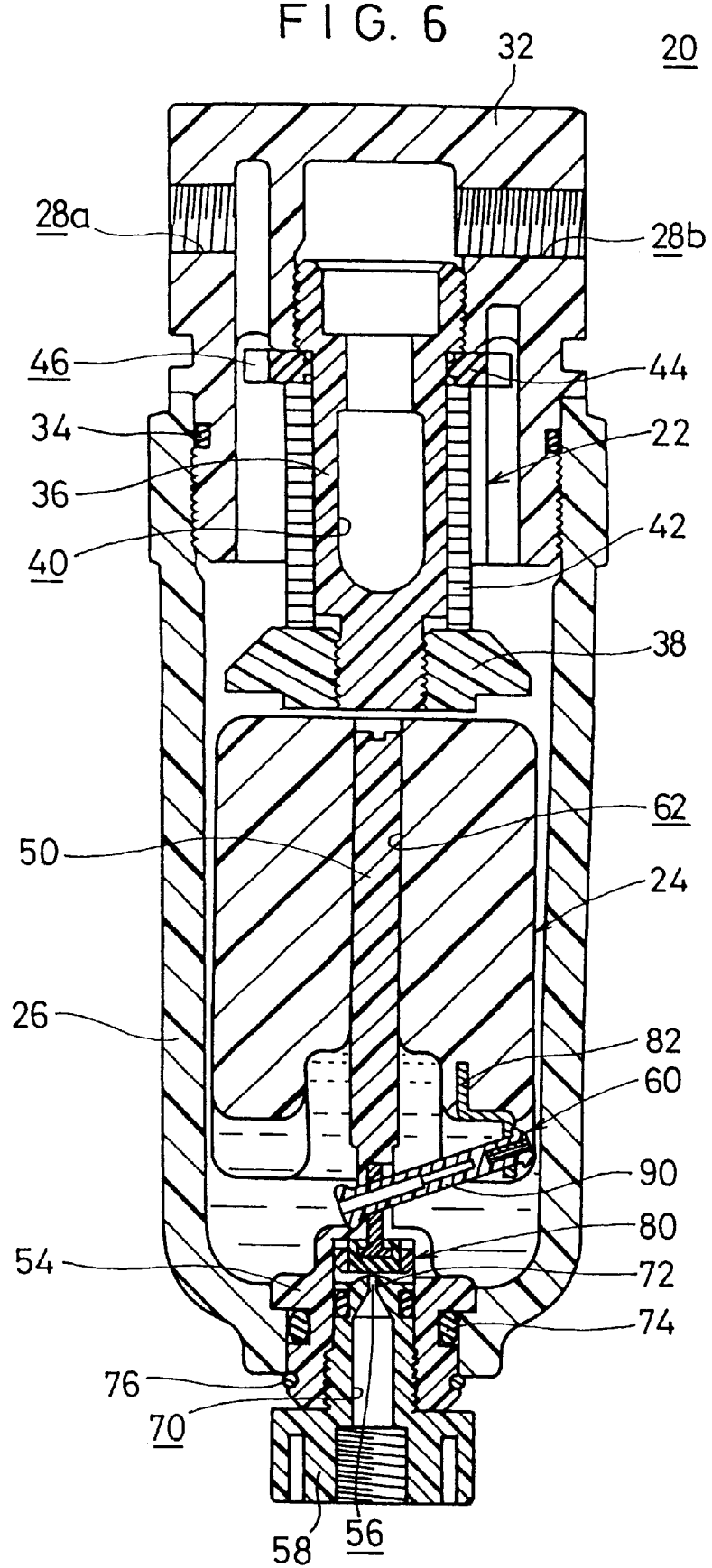
FIG. 6 illustrates the operation in a state in which a lever makes swinging movement to discharge the drain from a drain discharge port.

As shown in FIG. 4, a hole 62, which penetrates in the axial direction, is formed at a substantially central portion of the float 48. The guide section 50 is designed to be insertable into the hole 62. As shown in FIG. 5, a plurality of projections 64, which are separated from each other by predetermined angles in the circumferential direction, are formed in the axial direction on the outer circumferential surface of the guide section 50. Only the forward ends of the projections 64 contact with the inner wall surface of the hole 62 of the float 48. Therefore, the contact area between the inner wall surface of the hole 62 of the float 48 and the outer circumferential surface of the guide section 50 is decreased to reduce the friction resistance, and thus it is possible to smoothly displace the float 48 in the upward and downward directions.

A seal member 66 is installed to an annular groove on the outer circumferential surface of the handle 58. A screw section 68, which is screwed into the screw hole of the holder 54, is formed on the outer circumferential surface of the handle 58. The handle 58 is formed with a hole 70 which penetrates in the axial direction (see FIG. 1). The drain discharge port 56, which communicates with the hole 70 for discharging the drain to the outside, is formed at a projection 72 disposed at a central portion of the upper surface of the handle 58. In FIGS. 1 and 4, reference numerals 74, 76 indicate seal members respectively.

Figure 7:
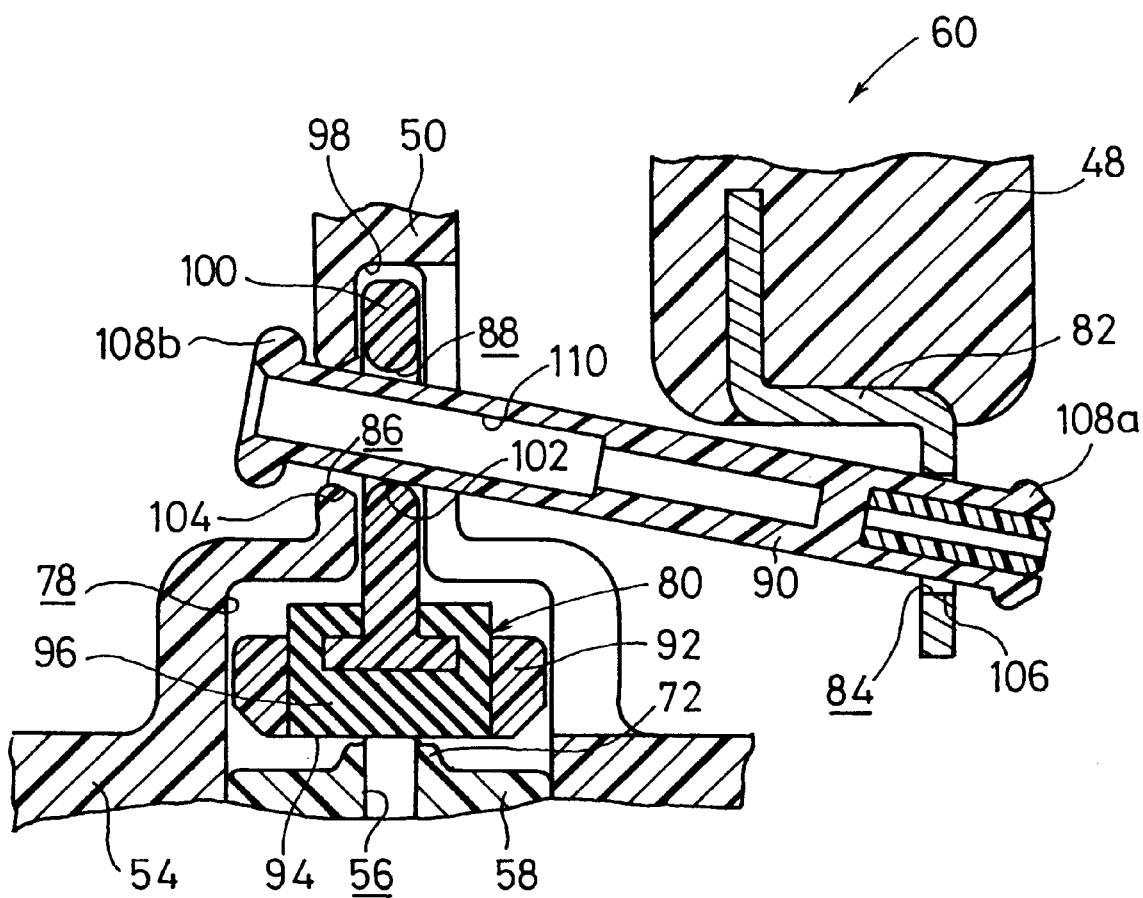
FIG. 7 shows a partial magnified longitudinal sectional view illustrating a state in which a swinging mechanism is at the initial position.

As shown in FIG. 7, the swinging mechanism 60 includes a valve plug 80 which is seated on the projection 72 formed at the upper surface portion of the handle 58 to close the drain discharge port 56 and which is displaced upwardly by a minute distance along the hole 78 of the holder 54 so that the valve plug 80 is separated from the projection 72 to open the drain discharge port 56, and a lever 90 for making the swinging movement by being linked to the displacement of the float 48, the lever 90 having a first end which is held on the side of the float 48 by the aid of a first holding hole 84 formed in a fastening fixture 82, and a second end which is held by a second holding hole 86 formed in the guide section 50 and a third holding hole 88 formed in the valve plug 80.

Each of the first to third holding holes 84, 86, 88 is formed to have a diameter which is slightly larger than the diameter of the lever 90. The fastening fixture 82 is secured to the float 48 by using, for example, an adhesive.

The valve plug 80 is integrally formed with a molded resin member 92 and a molded rubber member 96. The molded resin member 92 is formed of, for example, a synthetic resin material. The molded rubber member 96 is composed of, for example, a rubber material such as NBR, and it is formed with a flat sheet surface 94 for being seated on the projection 72 to close the drain discharge port 56. The molded resin member 92 has a projection 100 which faces a hole 98 formed at the junction of the holder 54 and the guide section 50. As shown in FIG. 7, the third holding hole 88, which is formed through the projection 100, has its inner circumferential surface which is chamfered to have a curved cross section. The inner circumferential surface of the second holding hole 86 formed through the guide section 50 is also chamfered, and it is formed to have a curved cross section.

The first end of the lever 90 is designed to make engagement with the first holding hole 84 of the fastening fixture 82 secured to the float 48. The second end of the lever 90 is designed to make engagement with the second holding hole 86 formed through the guide section 50 and the third holding hole 88 formed through the valve plug 80 respectively. Therefore, as shown in FIG. 7, the float 48 is in the lowered state in the ordinary situation in which the discharge of the drain to the outside is stopped. The lever 90 is in the state in which the lever 90 is inclined toward the fastening fixture 82 about the supporting point of the lower portion 102 of the third holding hole 88 of the valve plug 80, i.e., in the state in which the lever 90 is inclined slanting downward to the right. In this arrangement, the valve plug 80 is seated on the projection 72, and the drain discharge port 56 is closed by the sheet surface 94 of the valve plug 80.

Figure 8:
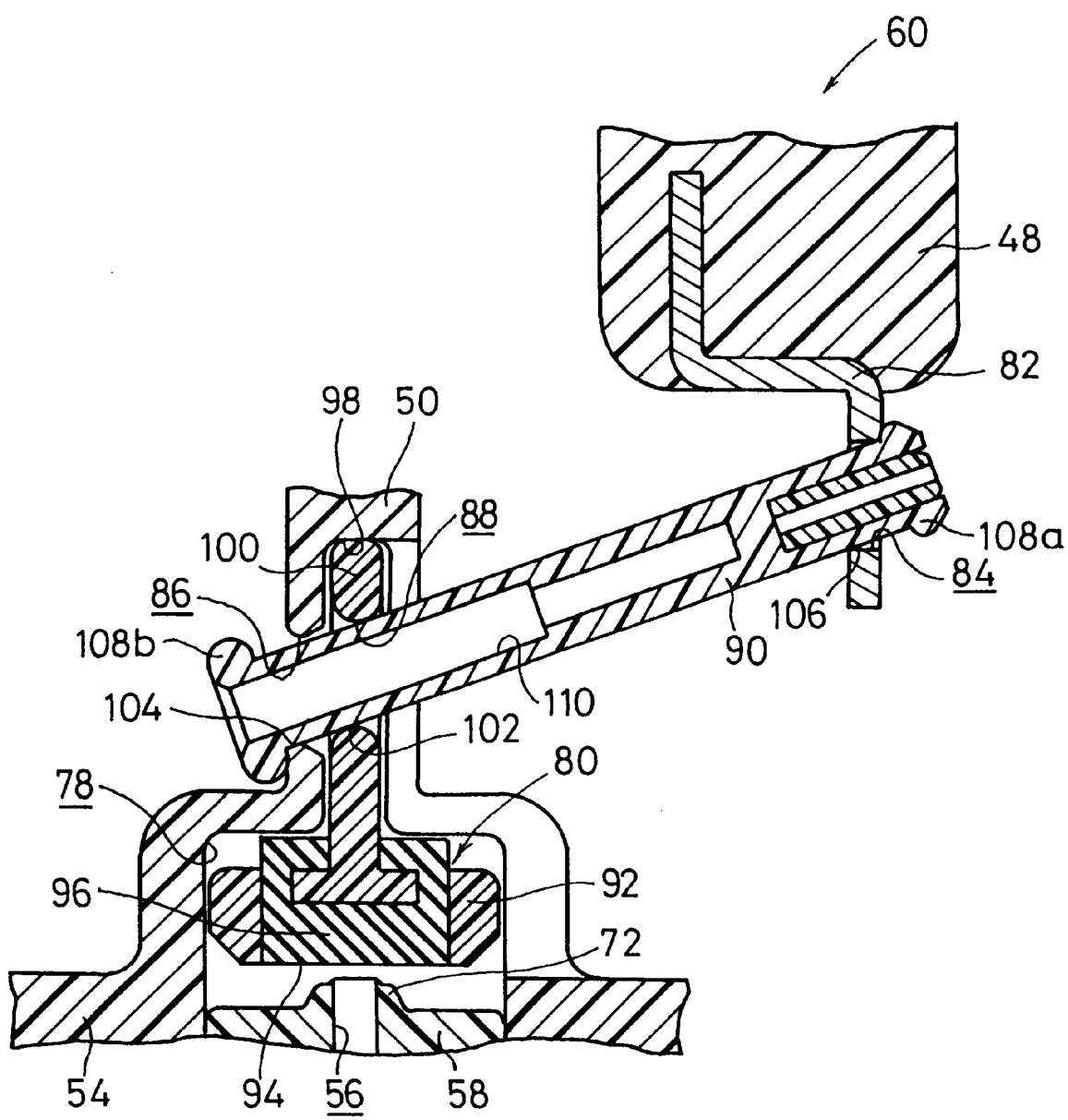
FIG. 8 shows a partial magnified longitudinal sectional view illustrating a state in which the lever makes swinging movement to discharge the drain from the drain discharge port.
Figure 9:
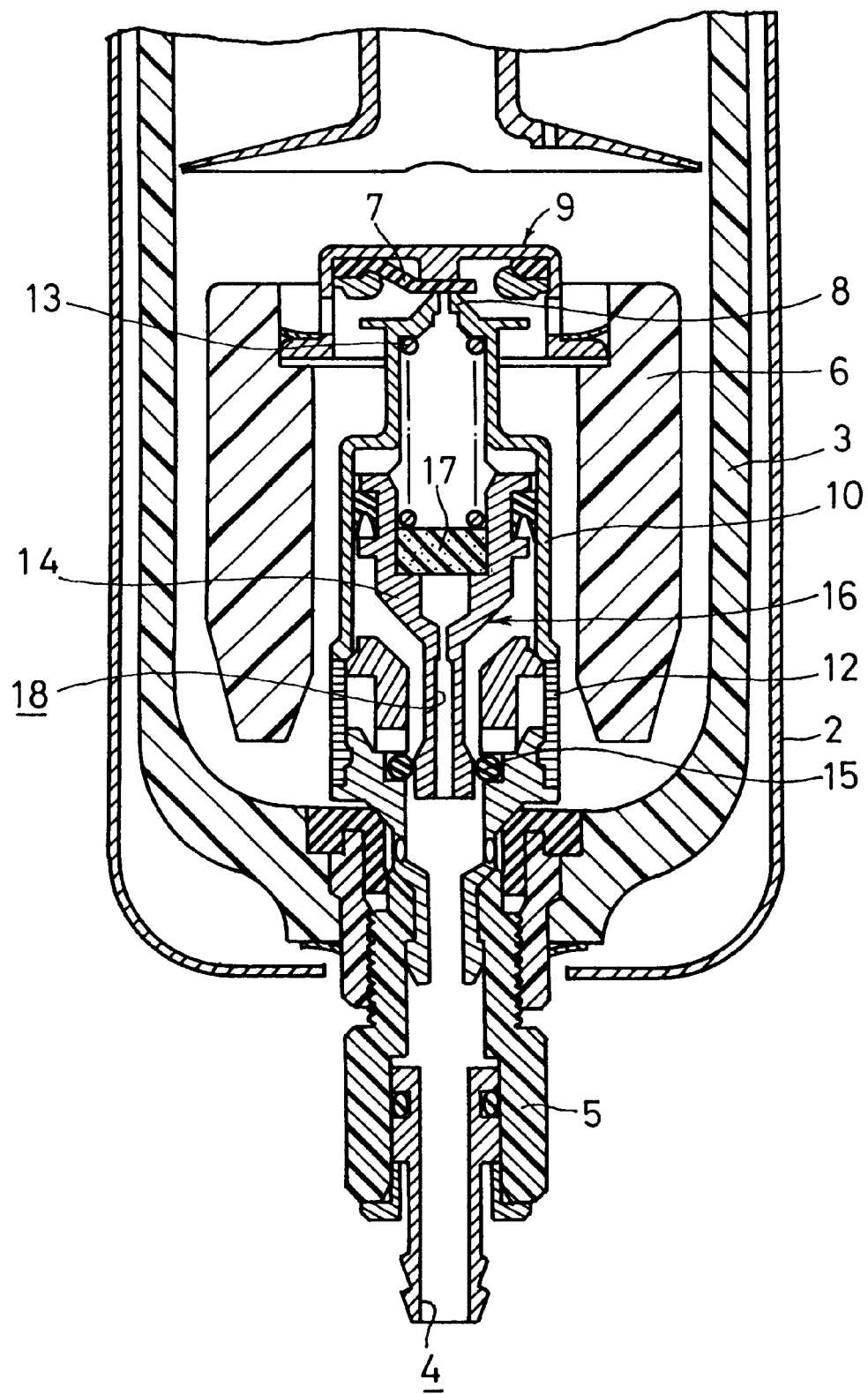
FIG. 9 shows a longitudinal sectional view illustrating a drain discharge apparatus concerning the conventional technique.
Figure 10:
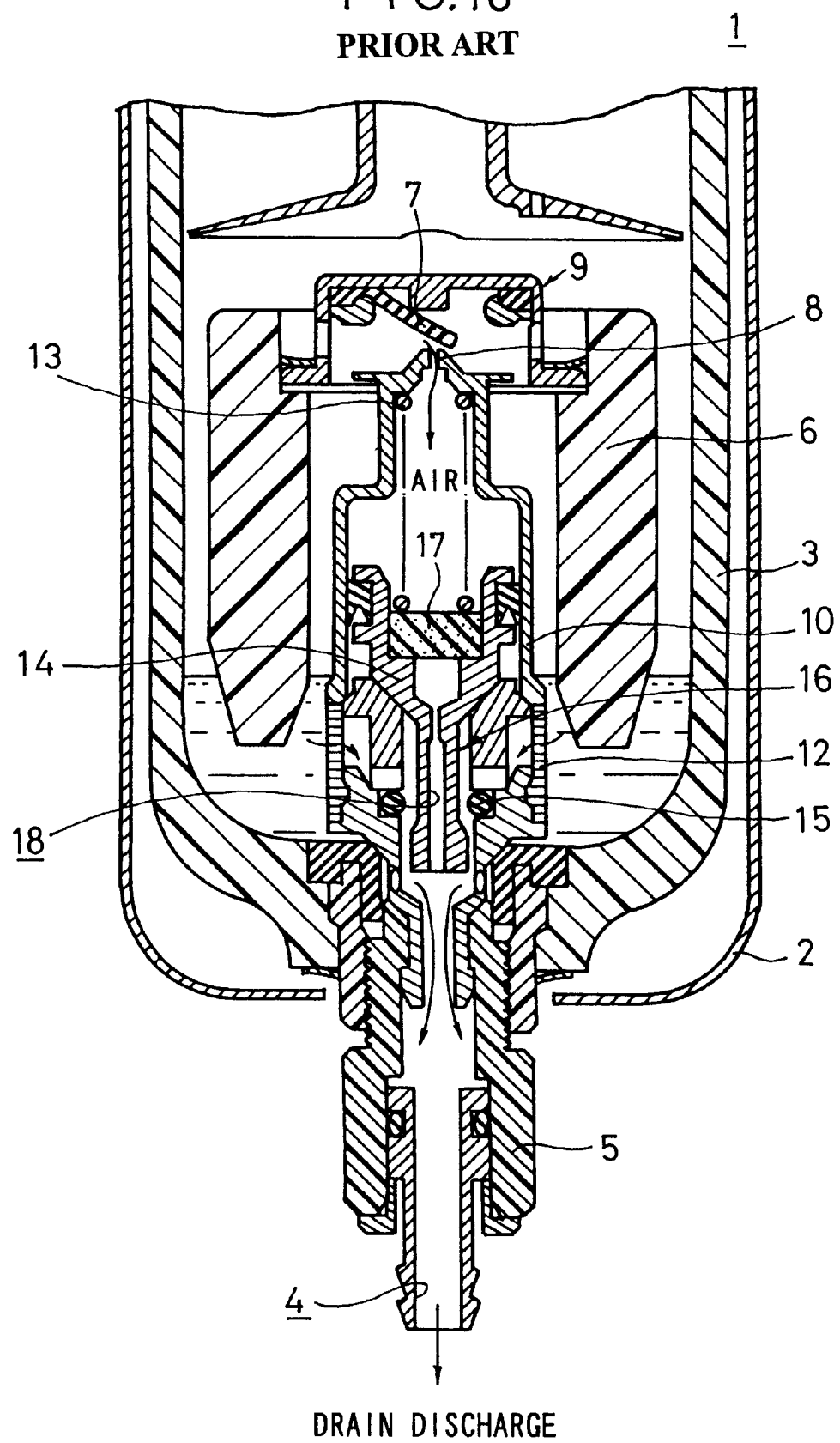
FIG. 10 shows a longitudinal sectional view illustrating a state in which the drain is discharged from the drain discharge apparatus shown in FIG. 9.

On the other hand, as shown in FIG. 8, in the state in which the drain is discharged to the outside, the float 48 is floated in accordance with the action of the drain, and the lever 90 makes the swinging movement by being linked to the float 48. That is, the lever 90 makes the swinging movement slanting upward to the right with the supporting point of the lower portion 104 of the second holding hole 86 of the guide section 50 and with the point of action of the lower portion 106 of the first holding hole 84 of the fastening fixture 82. In this situation, the valve plug 80 is moved upwardly by the minute distance by the aid of the lever 90 engaged with the third holding hole 88. The sheet surface 94 of the valve plug 80 is separated from the projection 72. As a result, the drain discharge port 56, which is formed at the projection 72, is opened. The drain, which is stored in the filter case 26, is discharged to the outside via the drain discharge port 56.

The lever 90 is composed of, for example, a synthetic resin material such as polyacetal. A first annular projection 108a and second annular projection 108b for preventing disengagement are formed at both ends in the longitudinal direction of the lever 90. A plurality of slits, which are separated from each other by predetermined angles in the circumferential direction, are arranged on the side of the first annular projection 108a.

A lightening hole 110, which extends in the axial direction, is formed at the inside of the lever 90 in order to realize a light weight of the entire apparatus.

The air filter 20, to which the drain discharge apparatus according to the embodiment of the present invention is applied, is basically constructed as described above. Next, its operation, function, and effect will be explained.

At first, the operation of the air filter 20 will be explained. It is assumed that the air filter 20 is connected to an unillustrated air pressure circuit via the compressed air inlet port 28a and the compressed air outlet port 28b.

The compressed air is introduced via the compressed air inlet port 28, and the swirl motion is applied thereto by the aid of the plurality of grooves 46 formed on the deflector 44. The water droplets and foreign matters are separated in accordance with the swirl motion. The drain, which includes, for example, the separated water droplets and foreign matters, is transmitted via the inner wall surface of the filter case 26, and it is accumulated at the lower portion of the filter case 26.

The compressed air, which is subjected to the swirl motion, is filtrated during the passage through the filter element 42. The filtrated compressed air is led to unillustrated another equipment from the compressed air outlet port 28b via the opening 40 of the rod 36.

Next, the operation of the drain discharge section 24 will be explained. The following explanation will be made assuming that the state as shown in FIG. 1 resides in the initial position, in which the drain is not accumulated yet, the float 48 is lowered, and the lever 90 is inclined slanting downward to the right.

The drain is transmitted via the inner wall surface of the filter case 26, and it is accumulated at the lower portion of the filter case 26. Accordingly, the amount of accumulation of the drain is increased, and thus the float 48 is gradually floated. The lever 90, which is held by the fastening fixture 82, makes the swinging movement by a predetermined angle in the counterclockwise direction from the initial position by being linked to the operation of the float 48 as a result of the arrival of the accumulation amount of the drain at a predetermined amount.

That is, starting from the initial position shown in FIG. 7, the lever 90 makes the swinging movement in the counterclockwise direction with the supporting point of the lower portion 102 of the third holding hole 88 of the valve plug 80 and with the point of action of the lower portion 106 of the first holding hole 84 of the fastening fixture 82. When the lever 90 makes the swinging movement by the predetermined angle to give the substantially horizontal state, the lever 90 further makes the swinging movement by a predetermined angle in the counterclockwise direction with the supporting point of the lower portion 104 of the second holding hole 86 of the guide section 50 and with the point of action of the lower portion 106 of the first holding hole 84 of the fastening fixture 82. During this process, as shown in FIG. 8, the valve plug 80 is moved upwardly by the minute distance by the aid of the lever 90 which is engaged with the third holding hole 88. The sheet surface 94 of the valve plug 80 is separated from the projection 72. As a result, the drain discharge port 56, which is formed at the projection 72, is opened. The drain, which is stored at the lower portion of the filter case 26, is discharged to the outside via the open drain discharge port 56.

When the drain in the filter case 26 is discharged, then the float 48 is gradually lowered in accordance with its self-weight to make the swinging movement in the direction (clockwise direction) opposite to the above by being linked to the operation of the float 48, and thus the initial position is restored.

That is, when the float 48 is lowered in accordance with its self-weight, the lever 90 makes the swinging movement in the clockwise direction by the aid of the fastening fixture 82. As shown in FIG. 7, the lever 90 is restored to the state in which the lever 90 is inclined toward the fastening fixture 82 with the supporting point of the lower portion 102 of the third holding hole 88 of the valve plug 80, i.e., to the initial state in which the lever 90 is inclined slanting downward to the right. In this process, the third holding hole 88 of the valve plug 80 is engaged with the lever 90, and the valve plug 80 is lowered. Accordingly, the sheet surface 94 is seated on the projection 72. The drain discharge port 56 is closed by the sheet surface 94 of the valve plug 80. When the drain discharge port 56 is closed, the discharge of the drain is stopped.

When an operator rotates the handle 58 in a predetermined direction to separate the drain discharge port 56 from the sheet surface 94 of the valve plug 80 so that the drain discharge port 56 is opened, the drain can be also discharged in accordance with the manual operation as well.

In the embodiment of the present invention, the valve plug 80 for opening and closing the drain discharge port 56 is directly operated by the lever 90 which is interlocked with the float 48. As a result, in the embodiment of the present invention, unlike the conventional technique, it is unnecessary to provide the first valve plug 9 which functions as the pilot plug. Therefore, the structure is simplified. It is possible to decrease the number of parts, and it is possible to reduce the production cost.

In the embodiment of the present invention, it is unnecessary to bleed the air remaining in the filter case 26. Therefore, as compared with the conventional technique, it is possible to avoid any waste of the air, and it is possible to decrease the amount of consumption of the air.

In the embodiment of the present invention, even when the air pressure is increased by newly supplying the air to the inside of the filter case 26 after exhausting the air in the filter case 26, it is possible to avoid any waste of the air, because the drain discharge port 56 is closed by the sheet surface 94 of the valve plug 80.

The embodiment of the present invention has been explained, in which the drain discharge apparatus is applied to the air filter 20. However, there is no limitation thereto. It is a matter of course that the drain discharge apparatus may be provided independently in the fluid pressure circuit, or the drain discharge apparatus may be applied to another fluid pressure equipment.

What is claimed is:

1. A drain discharge apparatus comprising:

a casing;

a float arranged in an internal space of said casing and provided displaceably in response to a drain stored at the inside of said casing;

a closing member provided at one end of said casing formed with a drain discharge port for discharging said drain stored in said casing to the outside;

a swinging mechanism for operating a valve plug for opening and closing said drain discharge port by the aid of a lever linked to displacement of said float, wherein said swinging mechanism includes a fastening fixture connected to said float for making displacement integrally with said float and formed with a first holding hole for making engagement with a first end of said lever; and a guide section fixed to said casing and formed with a second holding hole for making engagement with a second end of said lever;

wherein said valve plug is provided displaceably in a hole of said guide section and formed with a third holding hole for making engagement with said second end of said lever.

2. The drain discharge apparatus according to claim 1, wherein said guide section is formed to have a rod-shaped configuration capable of being inserted into a hole penetrating in an axial direction of said float, and a plurality of projections, which are separated from each other by predetermined angles in a circumferential direction, are formed in said axial direction on an outer circumferential surface of said guide section.

3. The drain discharge apparatus according to claim 1, wherein said closing member includes a handle for opening said drain discharge port by making separation from a sheet surface of said valve plug in accordance with manual operation.

4. The drain discharge apparatus according to claim 1, wherein said valve plug includes a molded rubber member formed with a flat sheet surface for closing said drain discharge port; a molded resin member made of a synthetic resin material for surrounding said molded rubber member; and a projection formed with an engaging hole for making engagement with said lever.

5. The drain discharge apparatus according to claim 1, wherein said lever is composed of a rod-shaped member formed with a hole extending in an axial direction, and a first annular projection and a second annular projection for preventing disengagement are formed at both ends in a longitudinal direction respectively.

6. The drain discharge apparatus according to claim 1, wherein said drain discharge apparatus resides in an air filter provided with a compressed air inlet port and a compressed air discharge port, and the air filter has a filter section, and a drain discharge section provided with said swinging mechanism.

7. The drain discharge apparatus according to claim 6, wherein said filter section includes a deflector for giving swirl motion to compressed air introduced from said compressed air inlet port; a baffle for preventing said drain separated by said deflector from being swirled upwardly; and a filter element for filtrating foreign matters contained in said compressed air.

\* \* \* \* \*